United States Patent [19]
Mizuno et al.

[11] Patent Number: 5,521,473
[45] Date of Patent: May 28, 1996

[54] APPARATUS FOR DRIVING AND CONTROLLING POWER WINDOW WHILE PROHIBITING DRIVE OF THE MOTOR DURING AN INITIAL PERIOD

[75] Inventors: Hiromitsu Mizuno; Shuichi Kawase; Yukio Iwasaki, all of Niwa-gun, Japan

[73] Assignee: Kabushiki Kaisha Tokai-Rika-Denki-Seisakusho, Aichi-Ken, Japan

[21] Appl. No.: 374,700

[22] PCT Filed: Jul. 28, 1993

[86] PCT No.: PCT/JP93/01064

§ 371 Date: Jan. 25, 1995

§ 102(e) Date: Jan. 25, 1995

[87] PCT Pub. No.: WO94/03968

PCT Pub. Date: Feb. 17, 1994

[30] Foreign Application Priority Data

Jul. 29, 1992  [JP]  Japan ..................................... 4-202243

[51] Int. Cl.[6] .................................................. H02P 3/00
[52] U.S. Cl. .......................... 318/285; 318/453; 160/293.1
[58] Field of Search .................................. 318/280–286, 318/466–470, 452, 453; 49/26, 28, 29, 30; 160/291, 292, 293.1; 361/23, 28, 29, 31

[56] References Cited

U.S. PATENT DOCUMENTS

| 4,346,003 | 12/1982 | Phipps | 318/467 |
|---|---|---|---|
| 4,455,517 | 6/1984 | Mitchell | 318/283 |
| 4,533,901 | 8/1985 | Lederle | 49/28 X |
| 4,614,902 | 9/1986 | Jessup | 318/282 |
| 4,686,598 | 8/1987 | Herr | 361/31 |
| 4,823,059 | 4/1989 | Compeau et al. | 318/466 X |
| 4,900,994 | 2/1990 | Mizuta | 318/283 |

FOREIGN PATENT DOCUMENTS

| 3332813 | 3/1985 | Germany . |
| 61-185643 | 11/1986 | Japan . |
| 64-89984 | 4/1989 | Japan . |
| 1-82693 | 6/1989 | Japan . |
| 3-15980 | 2/1991 | Japan . |
| 3-63091 | 6/1991 | Japan . |

*Primary Examiner*—Jonathan Wysocki
*Attorney, Agent, or Firm*—Oliff & Berridge

[57] ABSTRACT

In an apparatus for driving and controlling a power window according to the present invention, a blanking period is provided to stop the comparison between a variation amount of motor current and a threshold value, during a predetermined period of time T after the drive of the motor has been started. The catching of a foreign object is detected based on the motor current value in the latter half Tm of the blanking period, and is detected based on the variation amount of the motor current after the blanking period. Erroneous operation due to noise at the beginning of the drive of the motor is prevented, and the catching of a foreign object is reliably detected.

10 Claims, 4 Drawing Sheets

APPARATUS FOR DRIVING AND CONTROLLING POWER WINDOW WHILE PROHIBITING DRIVE OF THE MOTOR DURING AN INITIAL PERIOD

TECHNICAL FIELD

The present invention relates to an apparatus for driving and controlling a power window in which a door glass of a vehicle is raised and lowered by the driving force of a motor.

BACKGROUND ART

At a location near the driver's seat, there are provided manual switches and an auto switch as switches for the power window.

When the auto switch is operated by the driver so that the contacts for raising operation or the contacts for lowering operation are brought into the ON state, the drive of the motor is continued until the door glass is completely closed or completely opened even after the driver releases the auto switch. When the door glass is completely closed, the movement of the door glass is prevented by the widow frame or the like, whereby the drive current of the motor increases. The drive of the motor is stopped when the drive current exceeds a predetermined level.

By the way, it has been considered to detect an abnormal current due to the existence of a foreign object on the locus of the upward movement of the door glass so as to stop or reverse the motor. In some systems, there is provided a full-closure detecting switch for detecting the state that the door glass approaches its full closure position so as to discriminate a current increase due to the foreign object from a current increase due to the full closure of the door glass.

However, in the case where the detected drive current of the motor exceeds the predetermined value due to rush current at the beginning of the drive of the motor, such an increase in the drive current is sometimes regarded as abnormal current. To overcome this problem, a blanking period is provided for stopping the comparison between the variation amount of the motor current and the predetermined value at the beginning of the drive of the motor, thereby preventing unnecessary operations due to the above-described rush current.

However, the above-described conventional art has a problem that the catching of a foreign object cannot be detected if such catching occurs in a predetermined period of time (blanking period) following the start of the motor. If the blanking period is shortened considerably, a possibility arises that the variation amount of the motor current exceeds the predetermined value due to a variation in current (especially, an increase in current) which occurs during the transient period after the flow of rush current has started.

DISCLOSURE OF INVENTION

In view of the above-described facts, it is an object of the present invention to provide an apparatus for driving and controlling a power window which can prevent unnecessary operations due to noise (including rush current) during the initial period after the drive of a motor has been started, and which can reliably detect the catching of a foreign object even in the initial period.

The present invention provides an apparatus for driving and controlling a power window in which a door glass of a vehicle is raised and lowered by the driving force of an motor, wherein the apparatus includes motor drive current detection means for detecting a current flowing through the motor when the door glass is raised by the motor, current variation amount calculation means for calculating a variation amount of the current detected by the motor drive current detection means, first drive control means for stopping or reversing the motor when the variation amount of the current exceeds a predetermined value, a first timer for prohibiting the drive and control of the motor by the first drive control means during the initial period after the drive of the motor has been started, and second drive control means for immediately stopping or reversing the motor when the current detected by the motor drive current detection means exceeds the predetermined value in a drive control prohibiting period produced by the first timer, a second timer for prohibiting the drive and control of the motor by the second drive control means in the former half of the drive control prohibiting period produced by the first timer.

In the present invention, the drive and control of the motor by the first drive control means is prohibited by the first timer during the initial period after the drive of the motor has been started. Accordingly, the motor is not stopped or reversed even if the variation amount of the motor current exceeds the predetermined amount, for example, due to rush current. When the motor current detected by the motor drive current detection means exceeds the predetermined value during the latter half of the control prohibiting period, i.e., after the rush current has reached its peak, the motor is stopped or reversed by the second drive control means. Namely, in the former half of the drive control prohibiting period produced by the first timer, the second timer prohibits the drive and control of the motor by the second drive control means. Accordingly, only an abnormal current due to the catching of a foreign object can be detected without detecting a variation in current which occurs during the transition period after the peak of the rush current, which variation is usually regarded as an abnormal current if the detection of abnormal current is performed based on the variation amount of the motor current. Therefore, the motor can reliably be stopped or reversed when a foreign object is caught in the control prohibiting period.

The above-described apparatus for driving and controlling a power window according to the present invention has an excellent effect to prevent unnecessary operations due to noise (including rush current) during the initial period after the drive of the motor has been started, and to reliably detect the catching of a foreign object during the initial period.

BEST MODE FOR CARRYING OUT THE INVENTION

Figure 1:
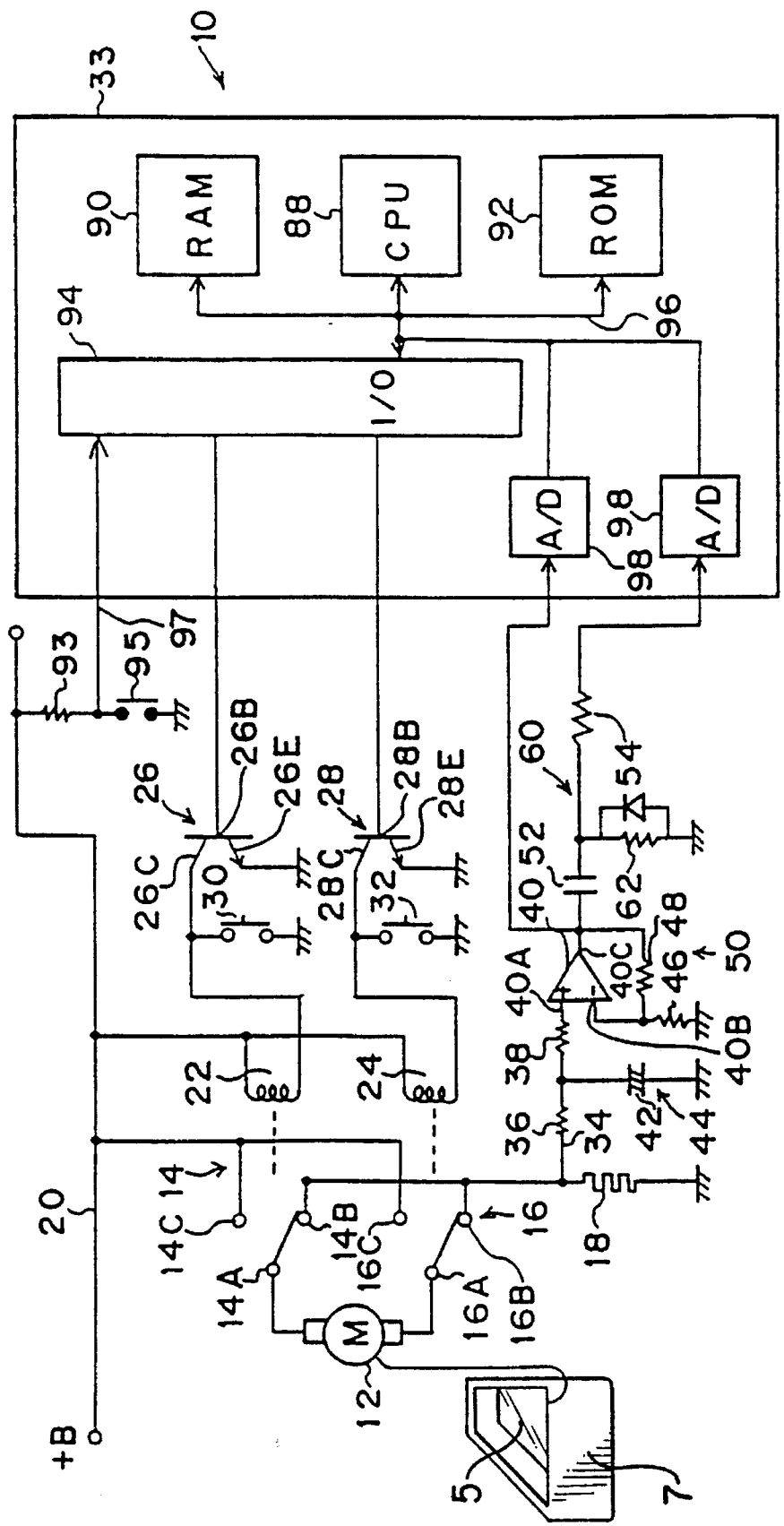
FIG. 1 is a circuit diagram showing an apparatus for driving and controlling a power window according to a present embodiment.

FIG. 1 shows a circuit diagram of an apparatus 10 for driving and controlling a power window according to the present embodiment.

Both terminals of a motor 12 for power window drive are connected to the common terminals 14A and 16A of relay circuits 14 and 16 (double contact type), respectively. The first relay circuit 14 is used for raising the door glass, and the first contact 14B thereof is grounded through a resistor 18 having a minute resistance (about 10 mΩ). The second contact 14C is connected to a power line 20. When the first coil 22 is not excited, the movable contact of the first relay circuit 14 is in contact with the first contact 14B. When the first coil 22 is excited, the movable contact is switched over to contact the second contact 14C.

Meanwhile, the second relay circuit 16 is used for lowering the door glass, and the first contact 16B thereof is grounded through the resistor 18 of minute resistance. The second contact 16C is connected to the power line 20. When the second coil 24 is not excited, the movable contact of the second relay circuit 16 is in contact with the first contact 16B. When the second coil 24 is excited, the movable contact is switched over to contact the second contact 16C.

One ends of the first and second coils 22 and 24 are connected to the power line 20, while their other ends are respectively connected to the collector terminals of first and second transistors 26 and 28 of NPN type.

To a line between the first coil 22 and the first transistor 26, one terminal of a manual switch 30 for raising operation is connected, while the other terminal thereof is grounded. Accordingly, when the manual switch 30 for raising operation is brought into its ON-state, the first coil 22 is excited to establish the contact between the movable contact of the first relay circuit 14 and the second contact 14C thereof, whereby the motor 14 is rotated in the forward direction to raise the door glass.

Also, to a line between the second coil 24 and the second transistor 28, one terminal of a manual switch 32 for lowering operation is connected, while the other terminal thereof is grounded. Accordingly, when the manual switch 32 for lowering operation is brought into its ON-state, the second coil 24 is excited to establish the contact between the movable contact of the second relay circuit 16 and the second contact 16C thereof, whereby the motor 14 is rotated in the reverse direction to lower the door glass.

Both the emitter terminals 26E and 28E of the transistors 26 and 28 are grounded, while their base terminals 26B and 28B are connected to a controller 33. The controller 33 is constituted to supply the respective base terminals 26B and 28B with predetermined signals. In response to these signals, electric currents start to flow from the collector terminals 26C and 28C of the transistors 26 and 28 to their emitter terminals 26E and 28E, whereby these transistors 26 and 28 are individually brought into the ON-state. Namely, these transistors 26 and 28 have the same functions as those of the manual switch 30 for raising operation and the manual switch 32 for lowering operation.

From one side of the resistor 18 of minute resistance closer to the power line 20, a signal line 34 is branched to detect motor current. The signal line 34 is connected to the non-inverted input terminal 40A of an amplifier 40 via resistors 36 and 38. To the line between the resistors 36 and 38, one terminal of an electrolytic condenser 42 is connected while the other terminal thereof is grounded so as to form a filter portion 44. The inverted input terminal 40B of the amplifier 40 is grounded through a resistor 46. Further, the output terminal 40C is connected to the inverted input terminal 40B via a feedback resistor 48 to form an amplifying circuit 50.

Further, the output terminal 40C of the amplifier 40 is connected to the controller 33 through a condenser 52 and a resistor 54. Since a differentiating circuit 60 is constituted by the condenser 52 and the resistor 62, the differential waveform of the drive current of the motor 12 is inputted to the controller 33.

Moreover, one end of another signal line is connected to the output terminal 40C, and the other end of the signal line is directed connected to the controller 33 to input the current value to the controller 33.

The controller 33 is composed of a CPU 88, a RAM 90, a ROM 92, an input/output port 94 and a bus line 96 including a data bus, a control bus and the like which connect the above components each other.

The drive current of the motor 12 and the differential waveform thereof are inputted to the controller 33 through A/D converters 98. The input/output port 94 outputs signals for turning on the above-mentioned transistors 26 and 28, respectively.

Further, an automatic operation signal is inputted to the input/output port 94 for commanding the controller 33 to automatically raise or lower the door glass. The automatic operation signal is input from a branch line 97 branched from a signal line one end of which is connected to the power line 20 and the other end of which is grounded via a resistor 93 and an auto switch 95 of a normal-open type. The branch line 97 is branched between the resistor 93 and the auto switch 95. Namely, when the auto switch 95 is in the ON state (operated state), no current flows to the branch line 97. When the auto switch 95 is in the OFF state (non-operated state), a current flows to the branch line 97. The auto switch 95 is mechanically connected to the manual switch 30 for raising operation and the manual switch 32 for lowering operation in such a way, for example, that when the manual switch 30 is moved by a small stroke, the manual switch 30 is brought into the ON state but the auto switch 95 is not brought into the ON state, and that when the manual switch 30 is moved by a large stroke, both the manual switch 30 and auto switch 95 are brought into the ON state.

The controller 33 continuously outputs an ON signal to the transistor 26 or 28 if once the auto switch 95 is brought into the ON sate. With this operation, the raising or lowering of the door glass can be continued even after the operating person releases the auto switch 95.

In the RAM 90, there is memorized a first threshold value which is used for the comparison with a differentiated waveform which is inputted from the A/D convertor 98, and a second threshold value which is used for the comparison with the motor current value which is directly inputted from the amplifier 40. In the CPU 88, the input signals are compared with these threshold values. When it is judged that an input signal is larger than a corresponding threshold value, it means that current having a magnitude greater than an allowable limit flows due to the catching of a foreign object. In such a case, the output of the ON signal to the first transistor 26 is stopped.

The CPU 88 utilizes a blanking period for stopping the comparison between the variation of the motor current and the first threshold value in a predetermined period of time T after the drive of the motor 12 has been started.

The blanking period serves to prevent unnecessary operations which would otherwise occur when rush current at the beginning of the drive of the motor 12 is detected as an abnormal current.

In the CPU 88, a predetermined period of time Tm corresponding to the latter half of the blanking period is defined as a compensation period, during which the motor current value is compared with the second threshold value.

The compensation period serves to detect abnormal variations in the variation amount of the motor current which occurs in the transient period of the current.

In other words, the catching of a foreign object is not detected during the period of time t1 (T-Tm) immediately after the drive of the motor 12 has been started. The catching of a foreign object can be detected based on the motor current value in the subsequent blanking period, and can be detected based on the variation amount of the motor current after the blanking period.

The provision of the period of time t1 immediately after the drive of the motor 12 has been started prohibits the automatic operation where the auto switch 95 is operated in a very short time (so called "momentary pressing").

The operation of the present embodiment will now be described.

When the door glass is to be manually raised, the manual switch 30 for raising operation is operated by a small stroke, whereby the first coil 22 is excited to change over the movable contact of the first relay circuit 14 to contact the second contact 14C. At that time, the movable contact of the second relay circuit 16 is in contact with the first contact 16B. Therefore, the motor 12 rotates in the forward direction to raise the door glass. When the operation of the manual switch 30 is stopped after the door glass is moved to a desired position, the motor 12 is stopped so that the raise of the door glass is stopped.

On the contrary, when the door glass is to be manually lowered, the manual switch 32 for lowering operation is operated, whereby the second coil is excited to change over the movable contact of the second relay circuit 16 to contact the second contact 16C. With this operation, the motor 12 is reversed so that the door glass is lowered.

Figure 2:
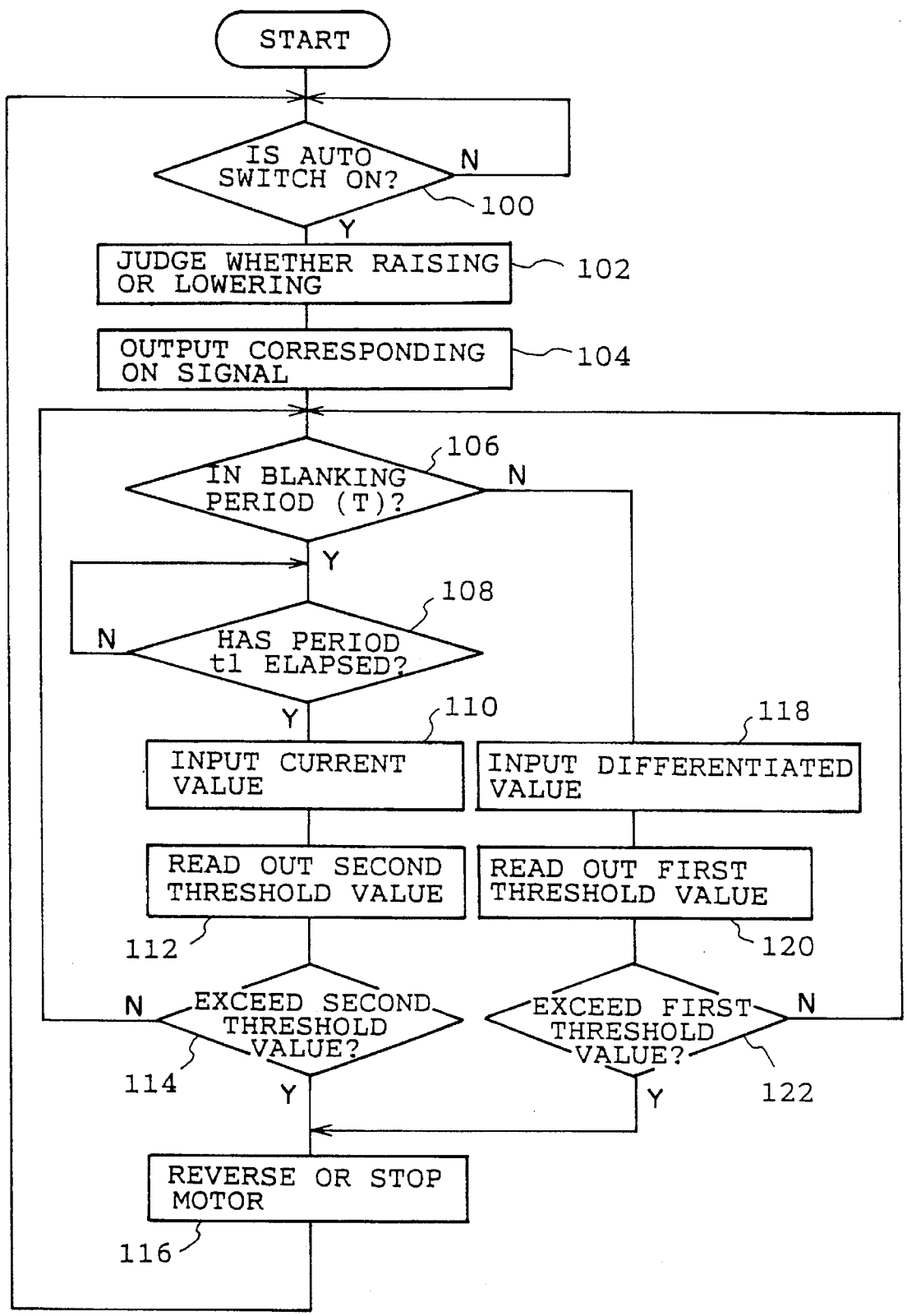
FIG. 2 is a control flowchart.
Figure 3:
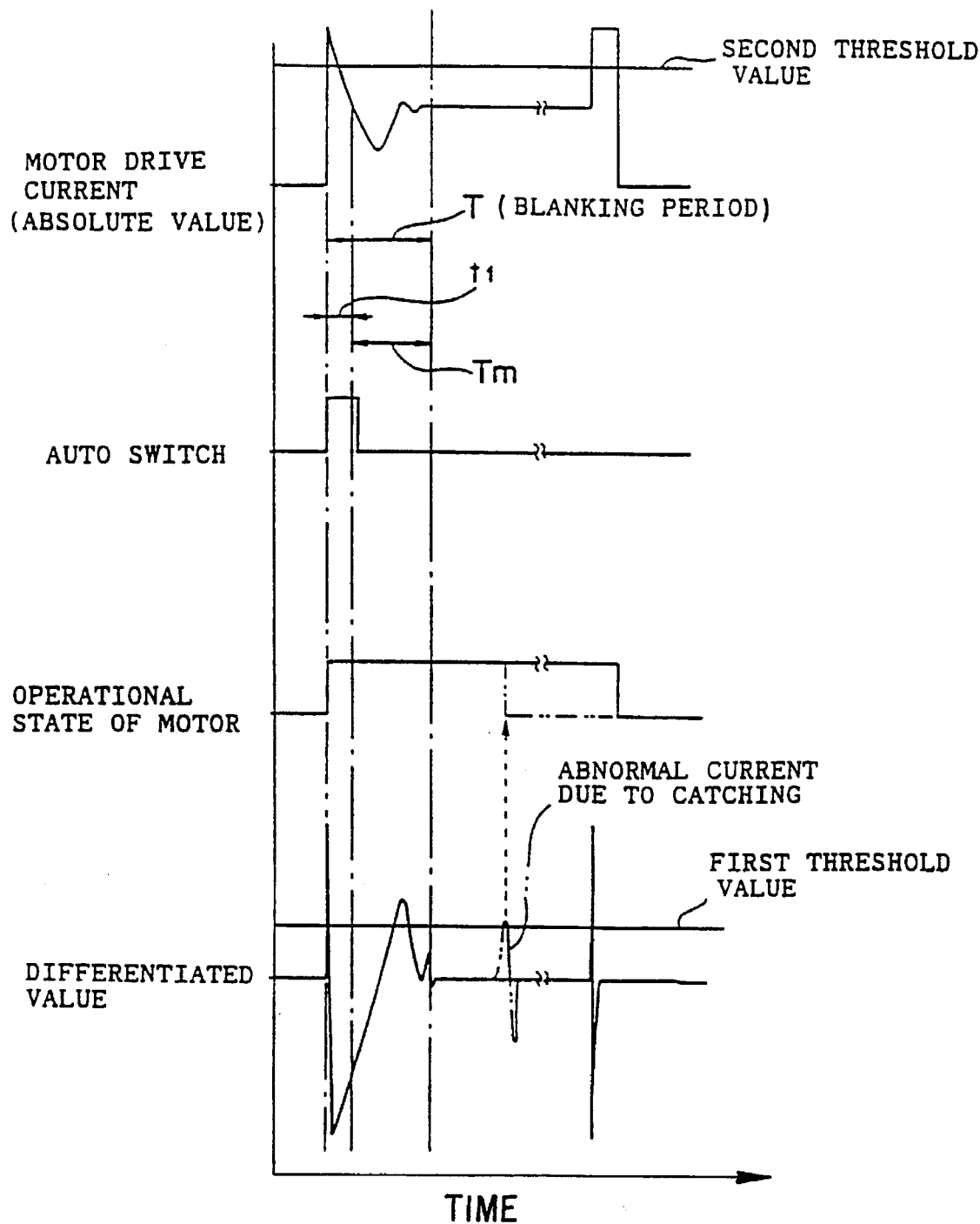
FIG. 3 is a time chart of the apparatus for driving and controlling a power window at the time when the dive of the motor has been started.
Figure 4:
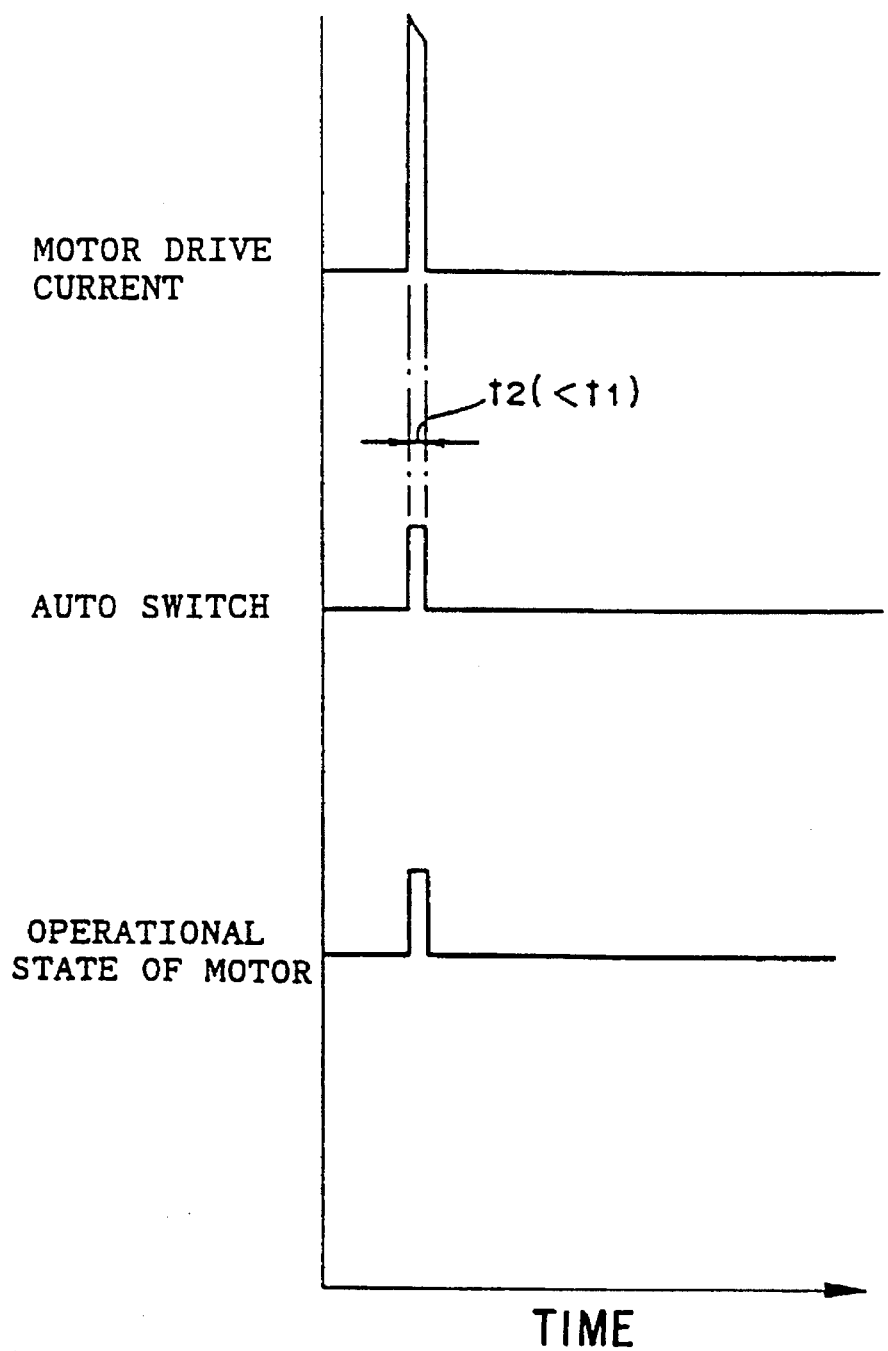
FIG. 4 is a time chart showing the case where the operating time of the auto switch is short.

When the manual switch 30 for raising operation is operated by a large stroke, the auto switch 95 is brought into the ON state, as well as the manual switch 30. The operation in the event that the auto switch 95 is brought into the ON state will be explained with reference to the flowchart shown in FIG. 2.

When it is confirmed in step 100 that the auto switch 95 is in the ON state, the processing moves to step 102 in which it is judged whether the door glass is to be raised or to be lowered. In step 104, an ON signal is outputted to the transistor 26 or 28 depending on the result of the judgment in step 102. With this operation, even after the driver releases the manual switch 30 for raising operation or the manual switch 32 for lowering operation, the excitation of the first coil 22 or the second coil 24 is continued so that the movement of the door glass is continued.

In the next step 106, it is judged whether now is in a blanking period. When an affirmative judgment is made, it means that now is in a period during which rush current flows due to the start of the drive. In this case, the processing moves to step 108 to stop the judgment for detecting the catching of a foreign object for a predetermined period of time t1. Accordingly, erroneous detection due to rush current which exceeds the threshold value can be prevented.

When it is judged in step 108 that the period of time t1 has elapsed, the processing moves to step 110 to directly input the motor current value from the amplifier 40, and then moves to step 112 to read out the second threshold value. In the next step 114, it is judged whether the input current value exceeds the second threshold value. When a negative judgment is made, the processing moves to step 106. On the contrary, when an affirmative judgment is made in step 114, it means that an abnormal current other than the current variation during the transition period in the blanking period, i.e., the catching of a foreign object is detected. In this case, the processing moves to step 116 to stop the output of the ON signal, and then moves to step 100.

With this operation, even when a foreign object is caught during the raising operation of the door glass, the foreign object and the door glass are prevented from being damaged.

When the processing moves to the step 106 as a result of a negative judgment in step 114, the processing in the steps 108, 110, 112 and 114 is repeated during the blanking period (actually, during the latter half Tm of the blanking period T). When it is judged in step 106 that the blanking period ends, the processing moves to step 118.

In step 118, the variation amount of the motor current is input, and the first threshold value is read out in the next step 120.

In the next step 122, it is judged whether the variation amount of the motor current exceeds the first threshold value. When a negative judgment is made, the processing moves to step 106 to repeat the processing in steps 118, 120 and 122. When an affirmative judgment is made in step 122, it means that the catching of a foreign object or the complete closure (complete open) is detected. In this case, the processing moves to step 116 to reverse or stop the motor, and then moves to step 100.

As described above, the apparatus according to the present embodiment can detect the catching of a foreign object over the entire period except the period of time t1(T-Tm) immediately after the drive of the motor 12 has been started. This detection is made based on the motor current value during the blanking period, and is made based on the variation amount of the motor current after the blanking period. After the blanking period, the catching of a foreign object can be detected based on the phenomenon that the absolute value of the motor current exceeds a predetermined value (i.e. based on the variation amount of the motor current and the absolute value of the motor current).

Since the catching of a foreign object is not detected during the period of time t1 after the drive of the motor 12 has been started, an automatic operation for raising or lowering the door glass is prevented from being started in the case where the operation time t2 of the auto switch 95 is shorter than the above-described period of time t1(t2<t1, momentary pressing operation).

In the present embodiment, the motor 12 is reversed or stopped upon the catching of a foreign object. However, if the motor 12 is required to be rotated in the backward direction (reverse rotation) for a predetermined period of time, a full-closure detecting sensor for detecting the full closure of the door glass must be provided so as to discriminate a current increase due to the catching of a foreign object from a current increase due to the full closure of the door glass.

We claim:

1. An apparatus for driving and controlling a power window in which a door glass of a vehicle is raised and lowered by the driving force of a motor, said apparatus comprising:

motor drive current detection means for detecting a current flowing through the motor when the door glass is raised by said motor, current variation amount calculation means for calculating a variation amount of the current detected by said motor drive current detection means, first drive control means for stopping or reversing said motor when said variation amount of the current exceeds a predetermined value, a first timer for prohibiting the drive and control of said motor by said first drive control means during an initial period after the drive of said motor has been started, and a second timer for prohibiting the drive and control of said motor by a second drive control means in a former half of a drive control prohibiting period produced by said first timer, the second drive control means for immediately stopping or reversing said motor when the current detected by said motor drive current detection means exceeds a predetermined value in the drive control prohibiting period produced by said first timer and after the time clocked by said second timer has elapsed.

2. An apparatus for driving and controlling a power window according to claim 1, wherein the value of current detected by said motor drive current detection means is an absolute value of the current.

3. An apparatus for driving and controlling a power window according to claim 1, wherein said variation amount of the current is obtained by differentiating the value of the current.

4. An apparatus for driving and controlling a power window according to claim 1, wherein said first drive control means also stops or reverses said motor when an absolute value of the current detected by said motor drive current detection means exceeds a predetermined value.

5. An apparatus for driving and controlling a power window according to claim 1, wherein said first timer prohibits the drive and control of said motor by said first drive control means by stopping the input of the current value detected by said motor drive current detection means during the initial period after the drive of said motor has been started.

6. An apparatus for driving and controlling a power window according to claim 1, further comprising a plurality of switches for operating said motor and moving said door glass, said switches including a manual switch for moving said door glass only when the manual switch is operated by a passenger, and an auto switch for moving said door glass to one of a full closed position and a full opened position in response to a slight operation of the auto switch by the passenger, wherein an operation of the auto switch is ignored when the auto switch is instantaneously operated for a period shorter than said initial period following the start of the drive of the motor.

7. An apparatus for driving and controlling a power window according to claim 1, wherein said first drive control means also reverses the motor for a predetermined period of time when the variation amount of the current exceeds a predetermined value.

8. An apparatus for driving and controlling a power window according to claim 1, wherein said second drive control means also reverses the motor for a predetermined period of time when the value of current detected by said motor drive current detection means exceeds a predetermined value.

9. An apparatus for driving and controlling a power window according to claim 7, further comprising a full-closure detecting sensor for detecting the full closure of the door glass.

10. An apparatus for driving and controlling a power window according to claim 8, further comprising a full-closure detecting sensor for detecting the full closure of the door glass.

* * * * *